United States Patent [19]

Roller et al.

[11] Patent Number: 4,739,130
[45] Date of Patent: Apr. 19, 1988

[54] MODULAR TURN SIGNAL SWITCH FOR HEAVY TRUCKS

[75] Inventors: Philip C. Roller, Ashville; John A. Cessna, Jamestown, both of N.Y.

[73] Assignee: Truck-Lite Co., Inc., Falconer, N.Y.

[21] Appl. No.: 99,526

[22] Filed: Sep. 22, 1987

[51] Int. Cl.$^4$ .................. H01H 3/16; H01H 9/02
[52] U.S. Cl. ............................ 200/61.27; 200/61.54
[58] Field of Search ............ 200/4, 61.27–61.38, 200/61.54, 302.1, 307

[56] References Cited

U.S. PATENT DOCUMENTS

| | | | |
|---|---|---|---|
| 3,892,932 | 7/1975 | Erdelitsch et al. | 200/61.27 |
| 4,179,592 | 12/1979 | Nitsch | 200/61.27 |
| 4,218,595 | 8/1980 | Honjo | 200/61.54 |
| 4,277,658 | 7/1981 | Delp et al. | 200/61.54 |
| 4,315,117 | 2/1982 | Kokubu et al. | 200/61.27 |
| 4,404,438 | 9/1983 | Honjo | 200/61.27 X |

*Primary Examiner*—J. R. Scott
*Attorney, Agent, or Firm*—Mason, Fenwick & Lawrence

[57] ABSTRACT

A three module turn signal switch assembly for heavy trucks and the like comprising an actuating lever housing module, an electric switch module, and a plug module in the form of separately produced units assembled together and removable from each other. The actuating lever module comprises a module casing, a handle member forming a control lever, a yoke member pivotally supporting the handle for lateral and vertical movement, and detent structure to define handle positions for Left Turn, Off, Right Turn and Emergency switch conditions. The switch module is releasably connected to the lever housing module and includes a casing and rotatable armature member driven responsive movement of the handle to these positions, and includes fixed contacts and movable actuator conductor segments to provide proper current paths for the selective switching functions. The plug module includes a housing having an electrical supply cord connected thereto and a forwardly opening cavity sized to receive the switch module h'ousing nested therein and has forwardly opening blade receiving recesses bounded by electrical contact terminals for electrical connection of the supply cord with the switch module contacts and conductors.

20 Claims, 4 Drawing Sheets

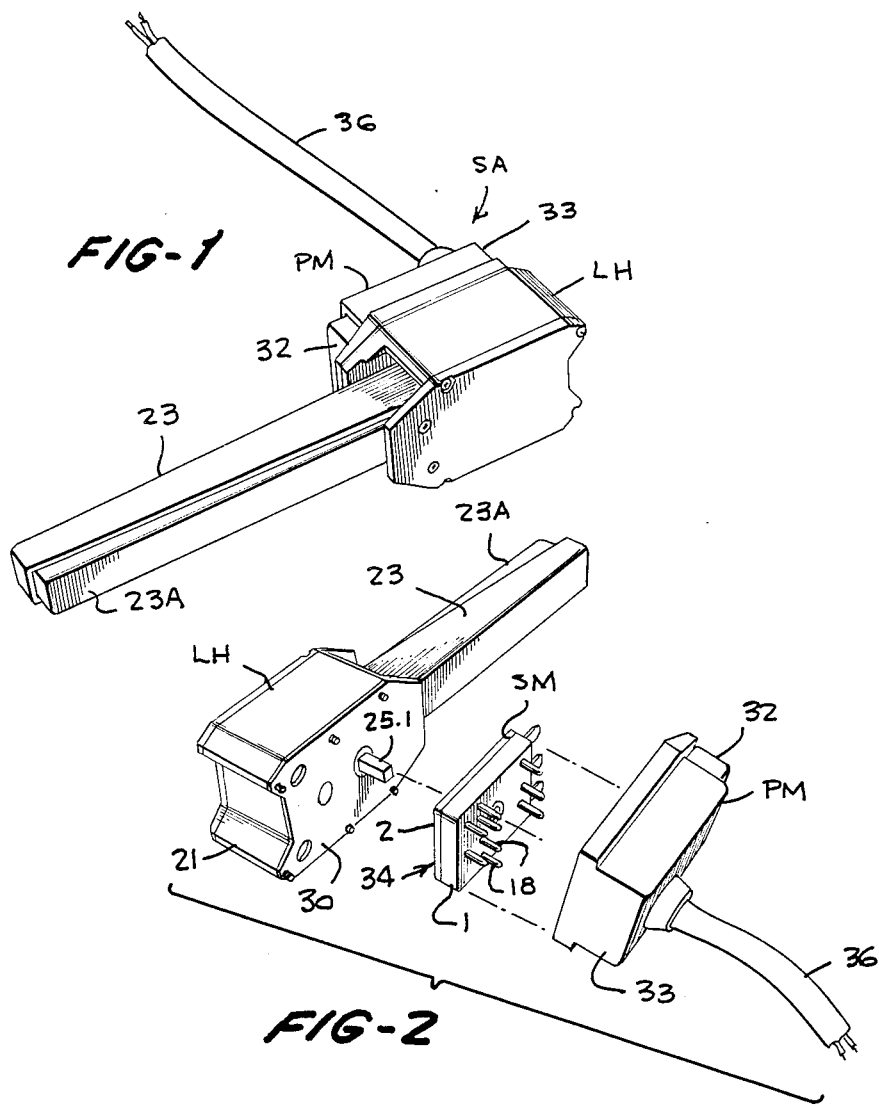
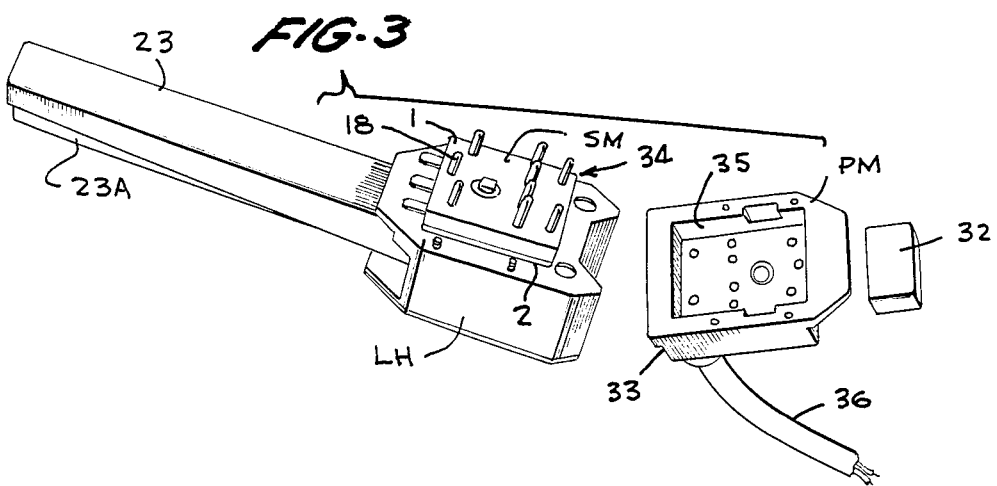

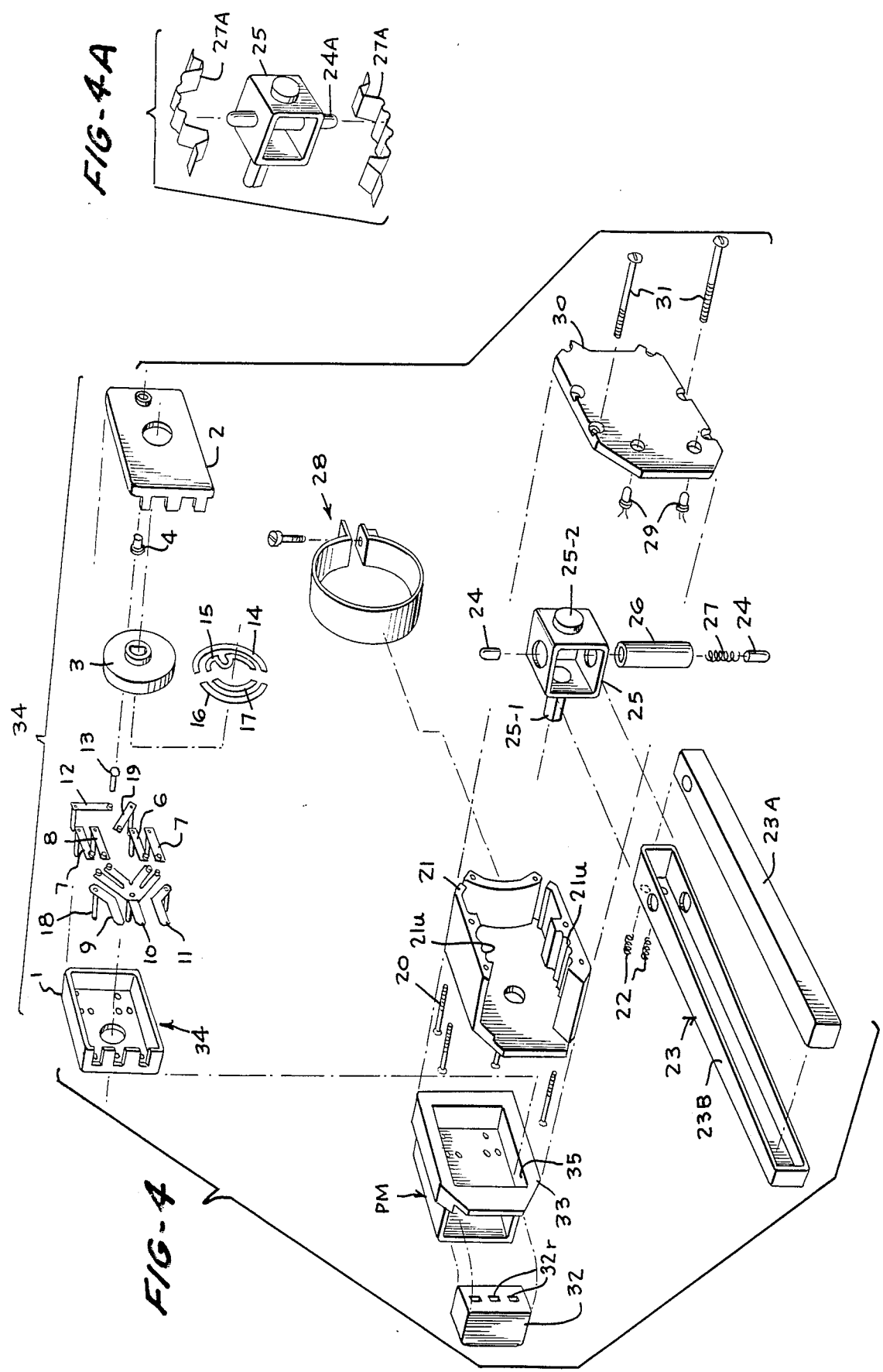

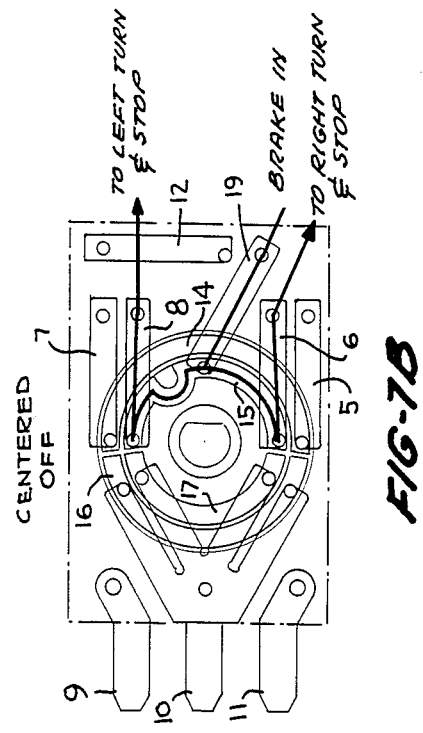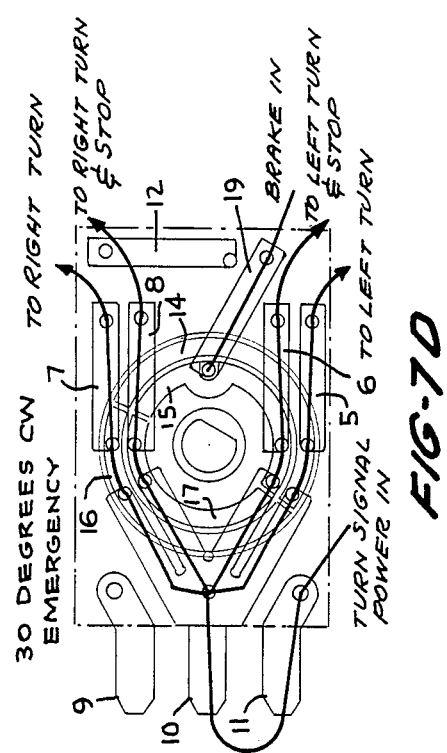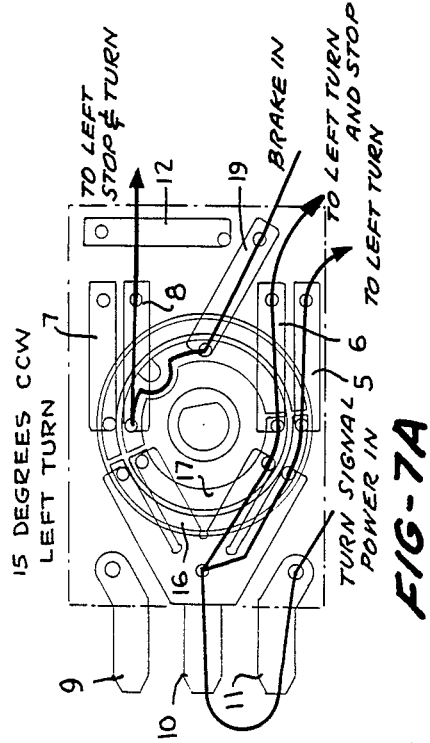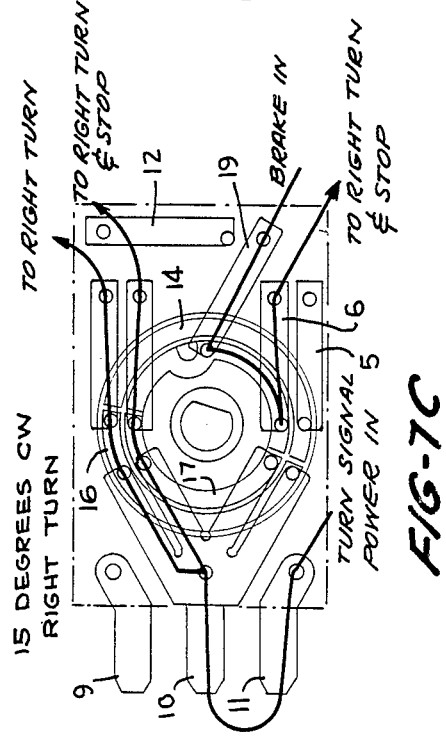

MODULAR TURN SIGNAL SWITCH FOR HEAVY TRUCKS

BACKGROUND AND OBJECTS OF THE INVENTION

The present invention is the provision of a turn signal switch assembly for heavy trucks and the like, and more particularly to a modular type turn signal switch assembly for heavy trucks having an electrical switch module, a lever housing module, and a plug module, as separately produced units which can be assembled and disassembled readily.

Heretofore, most heavy turn signals switches for trucks and the like have been constructed as an integral unit in which all of the switching, mechanical positioning, and wiring components are incorporated. In most cases, the electrical contacts are of a point contact type. These are either cam actuated or arranged to be slidable together by a rotating or linear motions supplied by a turn signal lever. Connections to the lighting system of the truck is generally accomplished by direct wiring from the handle and switch unit.

Such present switch assemblies are prone to failure due to erosion of the switch contacts caused by the heavy current load experienced on modern heavy trucks. The emergency flasher system requires a complex actuation system or a separate switch to activate all of the turn signals circuits simultaneously. The constructions of many of the present units is quite fragile, especially in regard to the construction of the handle or actuating lever. Such present system rely on a remotely located flasher to flash the lamps as required.

Repair of such prior type switches requires the removal of the switch assembly from the steering column and cleaning of the point contacts. Because this is usually not economically feasible, the switch frequently is replaced in its entirety.

An object of the present invention is to provide to the heavy trucking industry a turn signal switch construction which will have superior service life, heavy electrical load capability, lower maintenance costs, and easier repair than units presently available. This is accomplished by providing the turn signal switch as an assembly which is modular in design, providing an electrical switching unit, a mechanical unit, and a wiring unit formed as separate units.

The switch module accomplishes all required electrical switching with one rotating moving part. The contacts are designed to be self cleaning, and a set of uncommitted contacts is made available which are activated by a push button, which in turn is activated by lifting of the handle. The module is sealed, and if the switch modules should fail it may be replaced quickly without removing the lever module from the steering column. An optional flasher may be plugged directly into the switch module.

The lever housing module is of the uncomplicated rugged design, of such construction that it is possible to replace internal parts of the lever housing module without removing the module from the steering column.

The plug module connects the switch module to the lighting circuits of the truck and ensures the retention of the flasher module and switch module.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a perspective view of the turn signal switch assembly of the present invention having the switch module, the lever housing module, and the plug module assembled together in normal operating condition;

FIG. 2 is a perspective view of the three modules of the turn signal switch assembly shown separated from each other;

FIG. 3 is a perspective view showing the lever housing module and switch module assembled together and the plug module separated therefrom with the plug module positioned to show the forward or front face thereof which is not visible is FIG. 2;

FIG. 4 is an exploded perspective diagram showing the construction details and components of the turn signals switch assembly;

FIG. 4A is a perspective view of an alternate arrangement for the detent system for the handle;

DETAILED DESCRIPTION OF A PREFERRED EMBODIMENT

Figure 5:
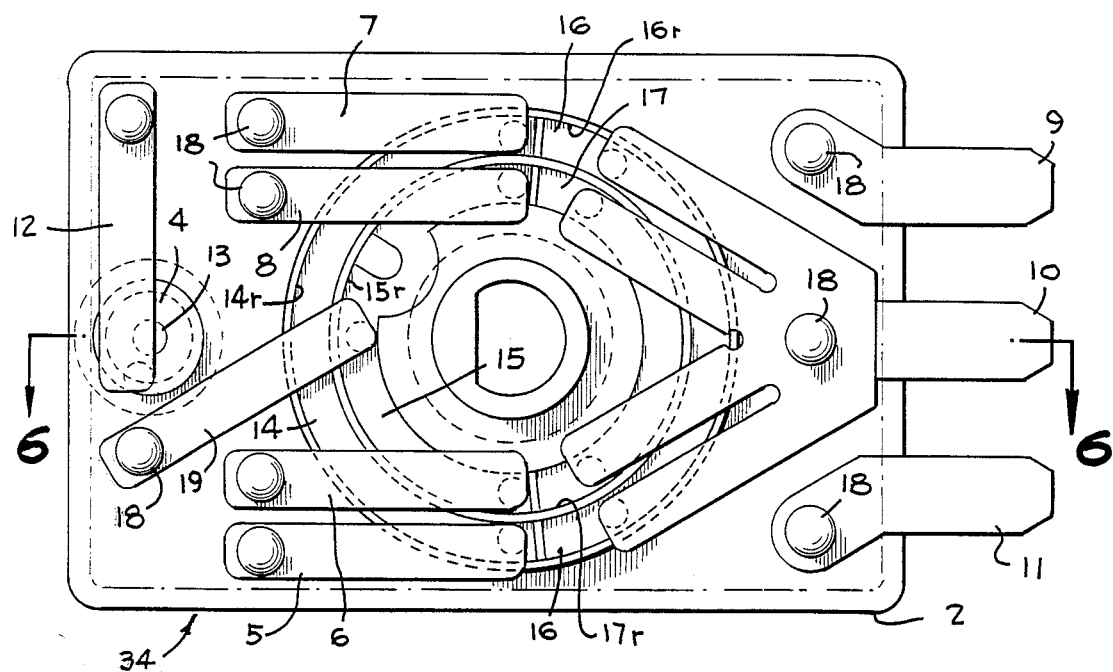
FIG. 5 is a vertical transverse section view of the switch module, with the parts of the front case section and the electrical connectors or contacts shown in solid lines and the co-operating parts of the rear case section shown in broken lines.
Figure 6:
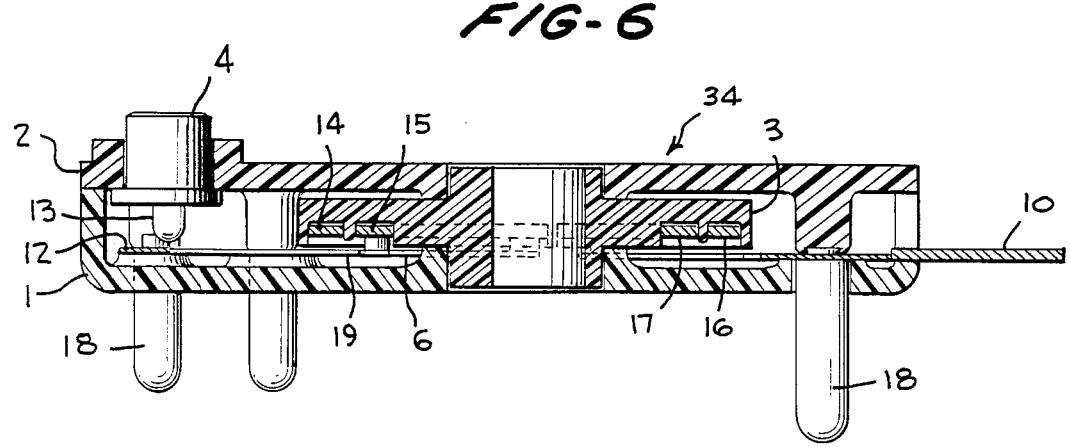
FIG. 6 is a horizontal section view through the switch module taken along the lines 6—6 of FIG. 5 and FIGS. 7A, 7B, 7C and 7D are switching diagrams with legends indicating the relationship of the contacts and spool assembly at various positions of the control handle.

Referring to the drawings, wherein like reference characters designate corresponding parts throughout the several figures, the turn signal switch of the present invention is indicated generally by the reference characters SA and is formed of three modules, a lever housing module LH, a switch module SM and a plug module PM.

The lever housing module LH positions the contacts in the switch module SM to provide the desired turn signal functions. The handle or control lever 23 may assume any one of four positions. These positions are, starting with the most counterclockwise position, Left Turn, Off, Right Turn, and Emergency. There is an interlock to prevent accidentally turning the handle 23 to the Emergency position when the Right Turn function is desired. Lifting the handle 23 activates a set of momentary contacts, later described, in the switch module SM for the purposes of activating a function specified by the user. Two indicator lamps in the front cover of the lever housing provide a visual indication of the select function.

The lever base 23B is made of plastic or formed or cast metal. This holds the lever insert 23A which is made of wood or structural plastic. The yoke 25 is made of molded plastic or metal and provides two planes of rotation (lateral and vertical) for the handle assembly. The lateral pivots are formed by cylindrical extensions 25.2 on the top and bottom which ride in corresponding holes in the top and bottom plates of the lever housing. The vertical pivot is formed by a tubular axle 26 which passes through the yoke and the handle assembly. The spring or springs 22 keep the handle in the desired vertical position. Lifting the handle works against the springs lowering its rear portion which in turn pushes the button protruding from the switch module SM. This action closes the momentary contacts within the switch module SM.

The four lateral handle positions are defined by a ball detent system which may consist of two cylindrical rods 24 with spherical ends pointing outward laterally in upward and downward directions with a coil spring 27 between forcing the spherical ends of the rods into undulating depressions 21a in the sides of the lever housing body 21. These depressions 21a have an angular displacement the same as the desired handle and switch positions thereby holding the switch in the selected position. An irregularly shaped extension on the bottom of the yoke 25.1 protrudes through the bottom plate of the lever housing LH and engages the spool 3 of the switch module SM. An alternate method for the detent uses a solid axle 24A with spherical ends with an undulating metallic spring plate 27A at each end as shown in FIG. 4A. Two high intensity light emitting diodes 29 used as indicator lights are mounted in the lever housing top or front cover plate 30. These are connected directly to the plug module PM by means of removable connectors of conventional construction. A clamp 28 is used to hold the assembly to the steering column.

The switch module SM connects the flasher to the appropriate lamp circuits by means of a rotating armature and stationary contacts. The armature 3 (referred to as the spool), is keyed to the irregularly shaped extension 25.1 extending from the handle housing 21 and thus has four discrete position corresponding to the four handle positions. The switch provides a brake light circuit interrupt for the appropriate stop and turn signal functions, the hazard warning function, left turn and right turn functions. It also provides a set of discrete contacts for activating an auxiliary function such as headlight diming. Three blade type connectors 9, 10 and 11 protrude from one end of the switch module housing 34 onto which a flasher 32 having blade receiving recesses 32r may be installed thereby providing easy access to the flasher for replacement. Connection to the plug module PM is made through pin or blade terminals 18 which are an integral part of the spring contact assemblies.

The housing 34, formed of case 1 and cover 2, holds the electrical connectors and contacts in position. The electrical connectors and contacts include the ground connector 9, the flasher input connector 10, the turn signal power input connector 11, the right turn contact 5, the right turn and stop contact 6, the left turn contact 7, the left turn and stop contact 8, the brake input contact 19, the movable momentary contact 12, and the fixed momentary contact 13. These connectors provide for connection to the plug module PM, the switch spool and the flasher. The front cover plate 30 is removably fastened to the lever housing case 1 by screws 31.

The spool assembly consists of a nylon or similar material spool body 3 and four arcuate metallic conductors 14, 15, 16, 17. These form the turn signal input conductors 16, 17, the brake circuit input and interrupt conductor 15, and the turn signal output conductor 14. The conductors 14-17 are positioned in recesses 14r, 15r, 16r, 17r in the spool body 3 and are engaged by the spring metal contacts 5-8 and 19 in such a fashion as to provide the proper current path for the switching functions. The spool assembly is turned by the irregularly shaped shaft 25.1 on the yoke 25 protruding from the lever housing LH. The brush contacts contact the conductors as dictated by the position of the handle of the lever housing thereby selecting the desired function, Left Turn, Off, Right Turn, and Emergency hazard warning).

A momentary button 4 is provided in the form of a plastic push button which is pressed by the rear portion of the switch handle 23 when the handle is lifted. It activates the momentary contacts in any of the four handle positions.

The cover 2 is permanently attached to the case 1 and retains all of the switch parts in proper relationship.

The switching diagram depicts the path of the electrical current from the lamps attached to the turn signal switch for the four positions as follows:

Left Turn

The switch spool 3 is rotated CCW 15 degrees to the position shown in FIG. 7A. The left turn lamps are connected to the flasher. The left turn and stop lamps are connected to the flasher. The right turn lamps are not connected. The right turn and stop lamps are connected to the stop circuit input.

Off

The switch spool 3 is in the center position shown in FIG. 7B. The left and right turn lamps are not connected. The left and right turn and stop lamps are connected to the stop circuit input.

Right Turn

The switch spool 3 is rotated CW 15 degrees to the FIG. 7C position. The left turn lamps are not connected. The left turn and stop lamps are connected to the stop circuit input. The right turn lamps and the right stop and turn lamps are connected to the flasher.

Emergency

The switch spool 3 is turned 30 degrees CW to the FIG. 7D position. All turn signal lamps are connected to the flasher. The stop circuit input is disabled.

The plug and wire module PM consists of a main housing 33 having a forwardly opening well or cavity 35 dimensioned to receive the switch module housing 34 fully nested therein, and having a cable 36 and forwardly opening blade receiving recesses and associated terminals which mate with the switch module blade terminals 18. These are either molded into a solid plastic body or snapped or otherwise held into a hard shell housing. The plug and wire module PM is removably secured to the peripheral portions of the lever housing case 1 by screws 20 and sandwiches the switch module SM between the module PM and the lever housing LH, and thereby holds the switch module SM and the flasher module 32 in place.

We claim:

1. A three module turn signal switch assembly for heavy trucks and the like comprising an actuating lever housing module, an electrical switch module, and a plug module, said modules being in the form of separately produced units assembled together and removable from each other for servicing and access, the actuating lever module comprising a module casing, a handle forming a control lever, means supporting an end portion of the handle within the casing for movement in two axes of rotation providing lateral and vertical movement of the handle, and means within the casing to define handle positions for Left Turn, Off, Right Turn and Emergency switch conditions, the switch module being releasably held against the casing of the lever housing module by said plug module and comprising a closed housing an rotatable armature member therein releasably coupled with an extension from said lever housing module to be driven thereby responsive to movement of the handle to said positions, the switch module also including fixed contacts and associated movable conductor carried by siad aramture member to selectively engage said fixed contacts and provide proper current paths for the selective switching functions, the switch module having blade type connectors protruding rearwardly from said closed housing and electrically connected to said fixed contacts, and said plug module comprising a housing having a forwardly opening cavity sized to receive the switch module closed housing in nested relation thereon and having a plurality of forwardly opening blade receiving recesses bounded by electrical contact terminals to conductively engage said blade type connectors connected to conductors of a supply cord assembled with said plug module housing.

2. A three module turn signal switch assembly as defined in claim 1, wherein the housing of said switch module has the shape of a rectangular solid having parallel rectangular front and rear faces, and said cavity of said plug module is of like rectangular solid shape sized to correspond to and intimately receive the switch module housing nested therein with the front face of the latter flush with a front face of the plug module with both front faces abutting a rear face of the lever housing module.

3. A three module turn signal switch assembly as defined in claim 3 wherein said movable conductors carried by said armature member are arcuate electrically conductive segments concentric with the axis of rotation of the armature member, the armature member being a cylindrical spool member of non-conductive material having concentric arcuate grooves in one face thereof receiving said conductive segments recessed therein.

4. A three module turn signal switch assembly as defined in claim 3 wherein said movable conductors carried by said armature member are arcuate electrically conductive segments concentric with the axis of rotation of the armature member, the armature member being a cylindrical spool member of non-conductive material having concentric arcuate grooves in one face thereof receiving said conductive segments recessed therein, said fixed contacts being thin elongated leaf spring contacts having brush members thereon for engaging said conductive segments.

5. A three module turn signal switch assembly as defined in claim 1, wherein said means supporting an end portion of the handle includes a yoke member connected to the handle end portion by an axle member forming upper and lower pivots defining a vertical pivot axis for the handle and the yoke member having a pair of lateral pivot members projecting therefrom journaled in said lever module casing and defining a horizontal pivot axis for the yoke member.

6. A three module turn signal switch assembly as defined in claim 2, wherein said means supporting an end portion of the handle includes a yoke member connected to the handle end portion by an axle member forming upper and lower pivots defining a vertical pivot axis for the handle and the yoke member having a pair of lateral pivot members projecting therefrom journaled in said lever module casing and defining a horizontal pivot axis for the yoke member.

7. A three module turn signal switch assembly as defined in claim 3, wherein said means supporting an end portion of the handle includes a yoke member connected to the handle end portion by an axle member forming upper and lower pivots defining a vertical pivot axis for the handle and the yoke member having a pair of lateral pivot members projecting therefrom journaled in said lever module casing and defining a horizontal pivot axis for the yoke member.

8. A three module turn signal switch assembly as defined in claim 4, wherein said means supporting an end portion of the handle includes a yoke member connected to the handle end portion by an axle member forming upper and lower pivots defining a vertical pivot axis for the handle and the yoke member having a pair of lateral pivot members projecting therefrom journaled in said lever module casing and defining a horizontal pivot axis for the yoke member.

9. A three module turn signal switch assembly as defined in claim 1, wherein said means supporting an end portion of the handle includes a yoke member connected to the handle end portion by an axle member forming upper and lower pivots defining a vertical pivot axis for the handle and the yoke member having a pair of lateral pivot members projecting therefrom journaled in said lever module casing and defining a horizontal pivot axis for the yoke member, and the lever module casing having cast in top and bottom walls thereof inwardly facing means defining depressions at different circumferential positions outwardly spaced about said horizontal axis and said yoke member having spring-biased detent members releasably urged toward said depressions to define said handle positions.

10. A three module turn signal switch assembly as defined in claim 2, wherein said means supporting an end portion of the handle includes a yoke member connected to the handle end portion by an axle member forming upper and lower pivots defining a vertical pivot axis for the handle and the yoke member having a pair of lateral pivot members projecting therefrom journaled in said lever module casing and defining a horizontal pivot axis for the yoke member, and the lever module casing having cast in top and bottom walls thereof inwardly facing means defining depressions at different circumferential positions outwardly spaced about said horizontal axis and said yoke member having spring-biased detent members releasably urged toward said depressions to define said handle positions.

11. A three module turn signal switch assembly as defined in claim 3, wherein said means supporting an end portion of the handle includes a yoke member connected to the handle end portion by an axle member forming upper and lower pivots defining a vertical pivot axis for the handle and the yoke member having a pair of lateral pivot members projecting therefrom journaled in said lever module casing and defining a horizontal pivot axis for the yoke member, and the lever module casing having cast in top and bottom walls thereof inwardly facing means defining depressions at different circumferential positions outwardly spaced about said horizontal axis and said yoke member having spring-biased detent members releasably urged toward said depressions to define said handle positions.

12. A three module turn signal switch assembly as defined in claim 4, wherein said means supporting an end portion of the handle includes a yoke member connected to the handle end portion by an axle member forming upper and lower pivots defining a vertical pivot axis for the handle and the yoke member having a pair of lateral pivot members projecting therefrom journaled in said lever module casing and defining a horizontal pivot axis for the yoke member, and the lever module casing having cast in top and bottom walls thereof inwardly facing means defining depressions at different circumferential positions outwardly spaced about said horizontal axis and said yoke member having spring-biased detent members releasably urged toward said depressions to define said handle positions.

13. A three module turn signal switch assembly as defined in claim 1, wherein said switch module additionally includes a plurality of discrete contacts including stationary contact members and movable spring contact members paired therewith and said handle having means for closing selected pairs of said contact members upon movement of said handle about said vertical axis at different angular positions of the handle about said horizontal axis.

14. A three module turn signal switch assembly as defined in claim 2, wherein said switch module additionally includes a plurality of discrete contacts including stationary contact members and movable spring contact members paired therewith and said handle having means for closing selected pairs of said contact members upon movement of said handle about said vertical axis at different angular positions of the handle about said horizontal axis.

15. A three module turn signal switch assembly as defined in claim 4, wherein said switch module additionally includes a plurality of discrete contacts including stationary contact members and movable spring contact members paired therewith and said handle having means for closing selected pairs of said contact members upon movement of said handle about said vertical axis at different angular positions of the handle about said horizontal axis.

16. A three module turn signal switch assembly as defined in claim 8, wherein said switch module additionally includes a plurality of discrete contacts including stationary contact members and movable spring contact members paired therewith and said handle having means for closing selected pairs of said contact members upon movement of said handle about said vertical axis at different angular positions of the handle about said horizontal axis.

17. A three module turn signal switch assembly as defined in claim 1, wherein said switch module includes three blade type connectors protruding from one end of the switch module housing, and a replaceable flasher unit having blade receiving recesses for the three blade type connectors to effect electrical coupling of the flasher unit with contacts and conductors of the switch module to produce lamp flashing functions.

18. A three module turn signal switch assembly as defined in claim 2, wherein said switch module includes three blade type connectors protruding from one end of the switch module housing, and a replaceable flasher unit having blade receiving recesses for the three blade type connectors to effect electrical coupling of the flasher unit with contacts and conductors of the switch module to produce lamp flashing functions.

19. A three module turn signal switch assembly as defined in claim 4, wherein said switch module includes three blade type connectors protruding from one end of the switch module housing, and a replaceable flasher unit having blade receiving recesses for the three blade type connectors to effect electrical coupling of the flasher unit with contacts and conductors of the switch module to produce lamp flashing functions.

20. A three module turn signal switch assembly as defined in claim 8, wherein said switch module includes three blade type connectors protruding from one end of the switch module housing, and a replaceable flasher unit having blade receiving recesses for the three blade type connectors to effect electrical coupling of the flasher unit with contacts and conductors of the switch module to produce lamp flashing functions.

* * * * *